June 15, 1954

J. J. OSPLACK 2,680,993

INDEX FIXTURE

Filed Nov. 4, 1947

INVENTOR.
Joseph J. Osplack
BY
Pennie, Edmonds, Morton & Barrows
ATTORNEYS

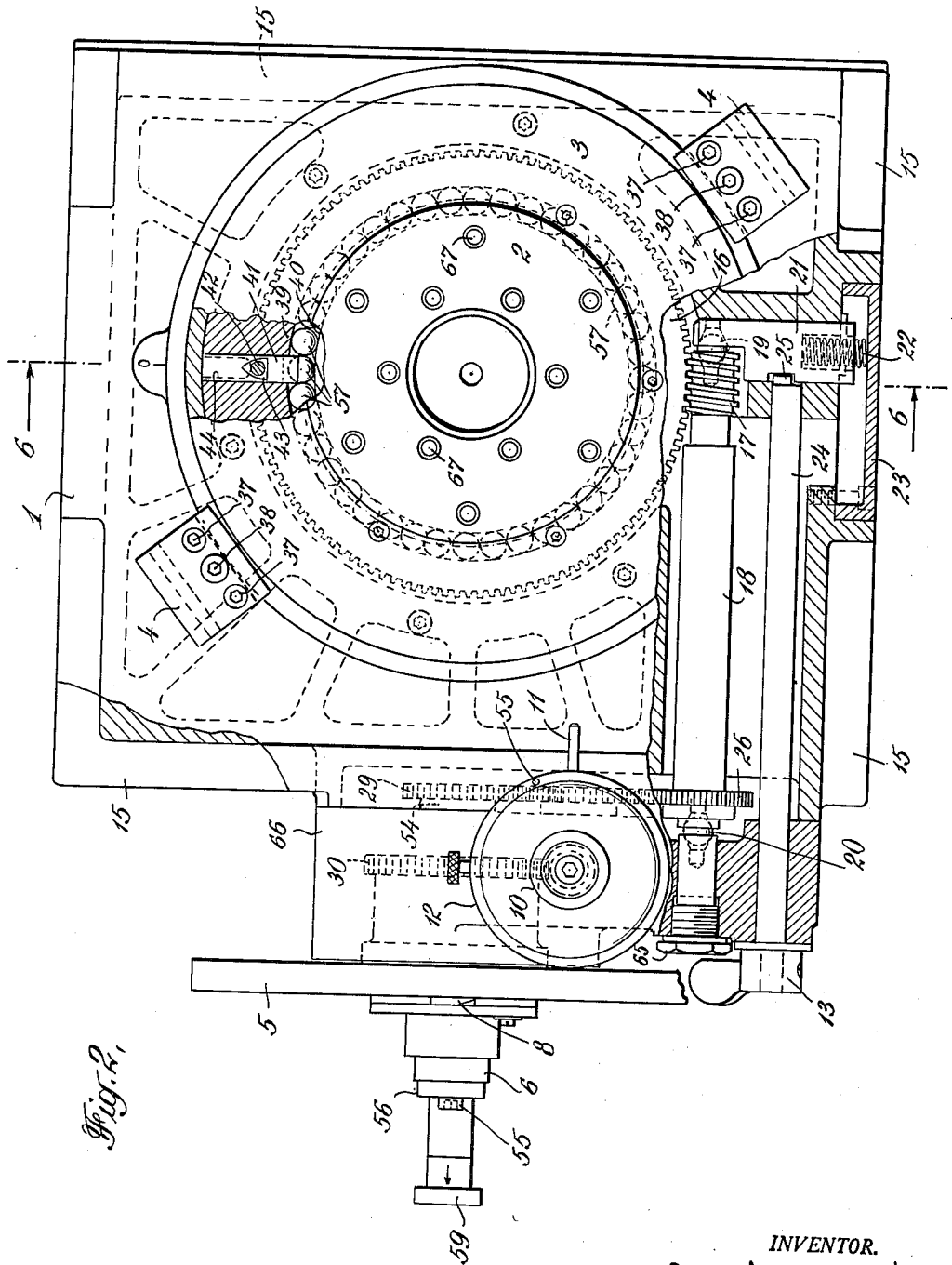

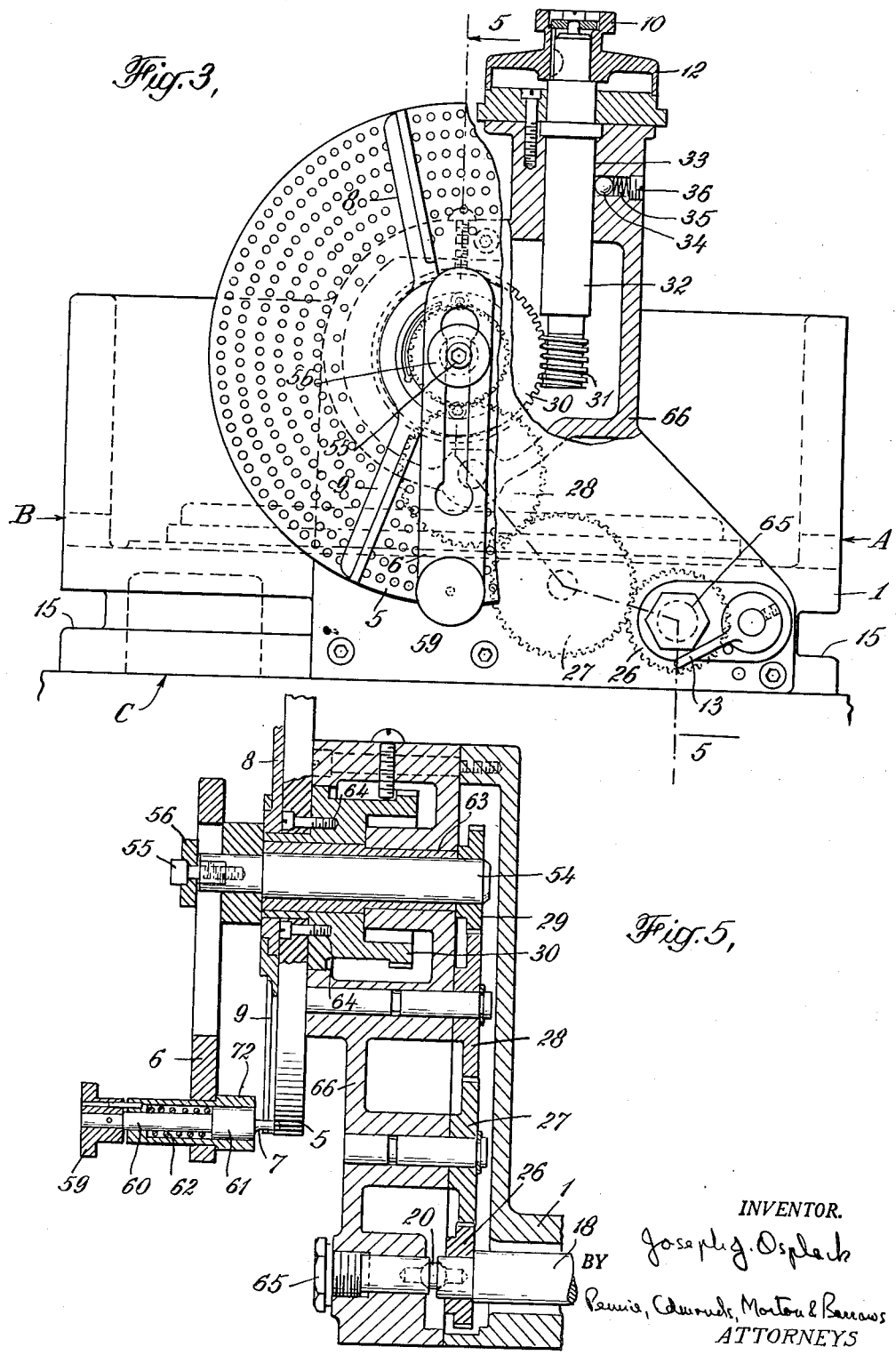

June 15, 1954
J. J. OSPLACK
INDEX FIXTURE
2,680,993
Filed Nov. 4, 1947
6 Sheets-Sheet 4
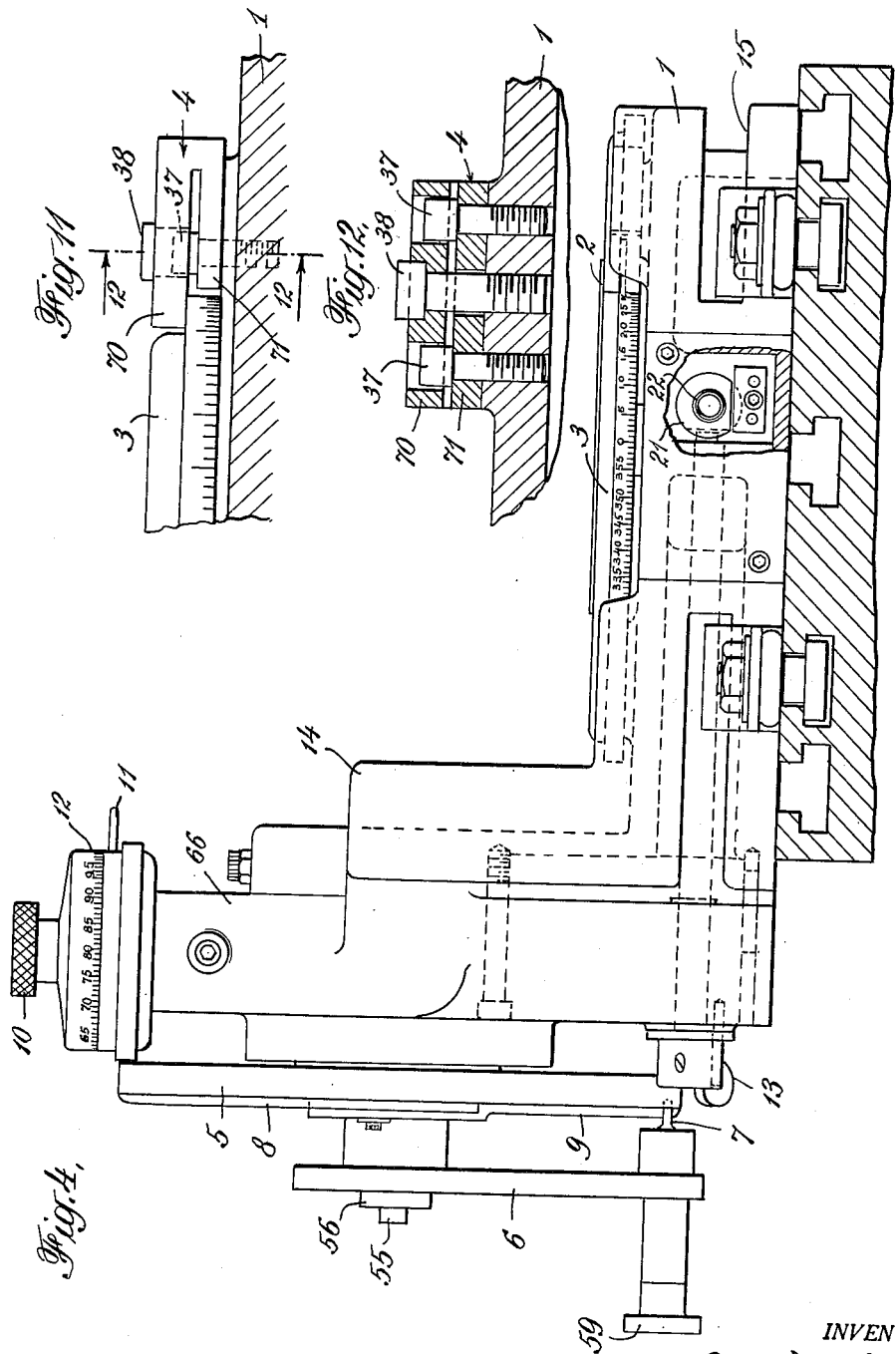
INVENTOR.
Joseph J. Osplack
BY
Pennie, Edmonds, Morton & Barrows
ATTORNEYS June 15, 1954  J. J. OSPLACK  2,680,993
INDEX FIXTURE
Filed Nov. 4, 1947  6 Sheets-Sheet 5
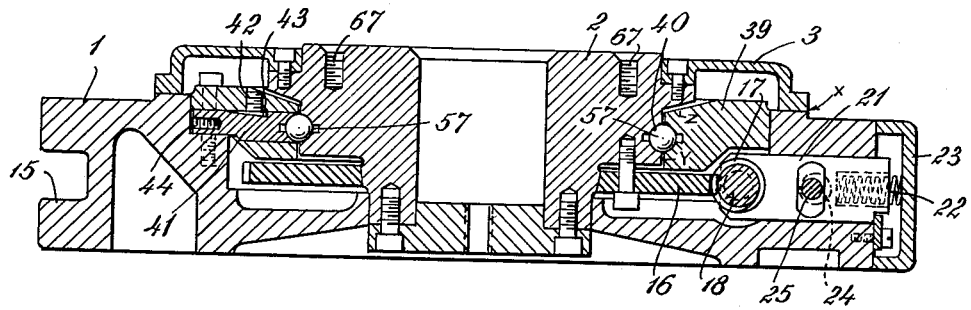
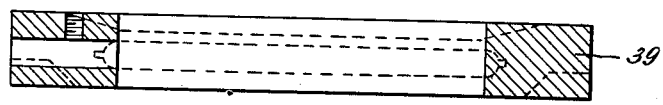
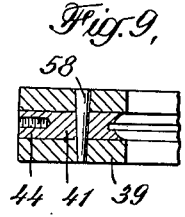
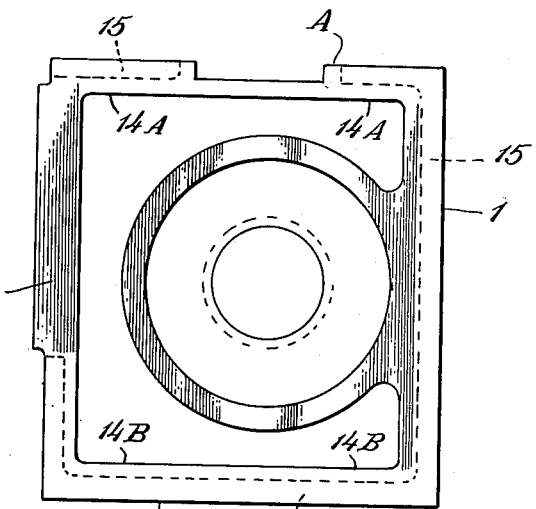
INVENTOR.
BY Joseph J. Osplack
Pennie, Edmonds, Morton & Barrows
ATTORNEYS June 15, 1954
J. J. OSPLACK
2,680,993
INDEX FIXTURE
Filed Nov. 4, 1947
6 Sheets-Sheet 6
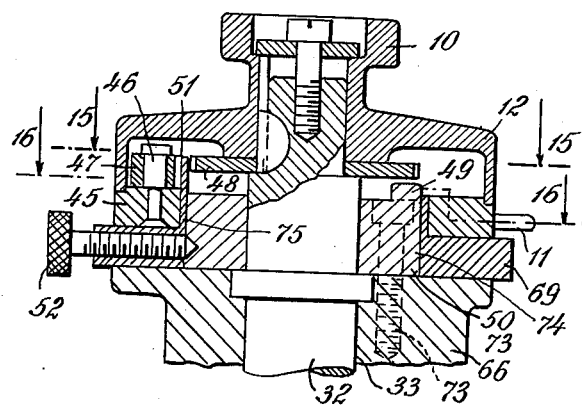
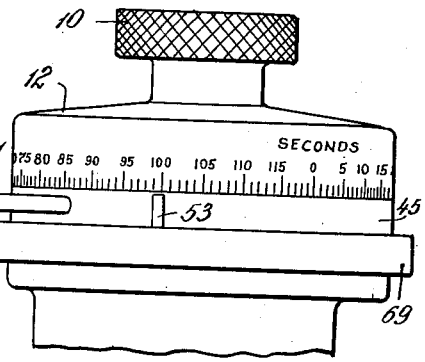
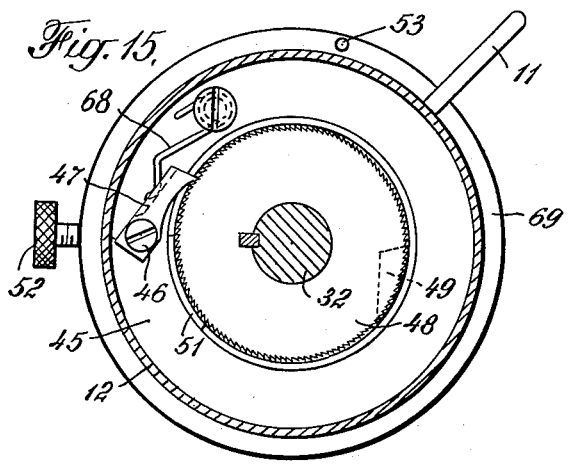
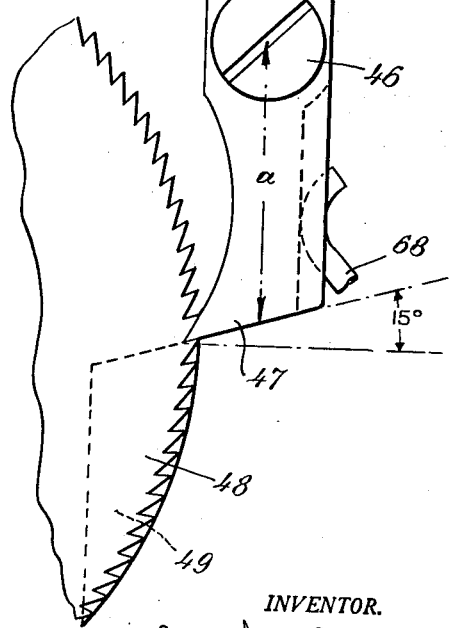
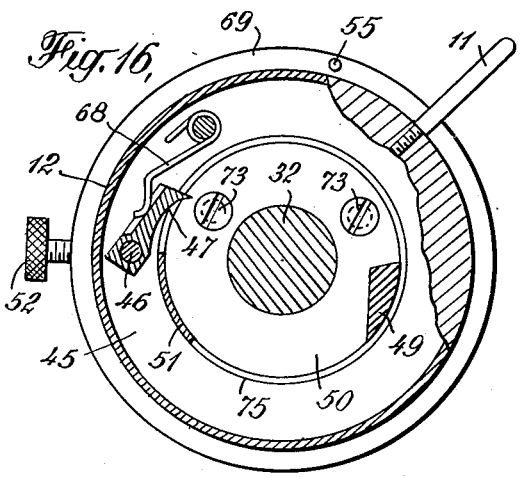
INVENTOR.
BY Joseph J. Osplack
Pennie, Edmonds, Morton & Barrows
ATTORNEYS Patented June 15, 1954

2,680,993

UNITED STATES PATENT OFFICE 2,680,993

INDEX FIXTURE

Joseph J. Osplack, Detroit, Mich., assignor to Vinco Corporation, Detroit, Mich., a corporation of Michigan Application November 4, 1947, Serial No. 783,935

5 Claims. (Cl. 90—57)

This invention relates to an indexing fixture and in particular to an indexing fixture for use in light manufacturing operations on work calling for close tolerances or for precision inspection of parts requiring angular checking.

One of the advantages of this invention is that the whole fixture is so arranged upon its base that the latter, which has three flat-ground faces, can be oriented to bring the work table parallel or perpendicular to the machine bed or chuck face to which it is attached and to permit the index arm to be arranged either to the left or to the right of the work, as particular applications may make convenient. The flat-ground faces and a special rib and groove structure base further provide not only for attachment by means of a magnetic chuck, but, also, by means of toe clamps without distortion.

A further advantage of this invention is that it provides through a "seconds" adjustment knob means for setting off any angle whatsoever with a standard eleven-row index plate, with an error not exceeding .5″. It is a feature of the present invention that the procedure for making indexing or checking operations of this order of precision is but little more complicated than that required for using the standard Cincinnati dividing head. The additional elements required for the new precision head are arranged for maximum operating convenience.

Yet another advantage of the fixture of the present invention is that it incorporates an antifriction bearing in the mounting of the work table constructed to be protected against overload according to the disclosure of applicant's Patent No. 2,352,911, while, at the same time, employing both an inner and outer wall race, each a solid ring, to obtain the maximum of precision.

Still a further feature of this invention is that, although the worm and wheel drive for the work table is releasable from the indexing head for independent rotation, driving engagement without backlash between that worm and wheel is assured.

In a refined embodiment of this invention, a ratchet mechanism is associated with the seconds adjustment so that, when repeatedly operating the fixture to turn off the identical angle, that portion of the angle to be turned off which is required to be set by the seconds adjustment may be set by a simple stop limited motion without necessity of reading a dial and without loss of precision.

One embodiment of the invention, including the ratchet refinement to that embodiment, is illustrated in the accompanying drawings, in which:

Fig. 2 is a plan view partly in section of the fixture illustrated in Fig. 1;

Fig. 3 is a front elevation partly in section of the fixture illustrated in Fig. 1;

Fig. 4 is a side elevation partly in section of the fixture illustrated in Fig. 1;

Fig. 5 is a section taken on the line 5—5 of Fig. 3;

Fig. 6 is a section taken on the line 6—6 of Fig. 2;

Fig. 7 is a section taken through the blank from which the outer race of the fixture work table is made to illustrate the steps in its machining;

Fig. 8 is a section similar to Fig. 7 through a finished and assembled outer race;

Fig. 9 is a partial section through a portion of an outer race assembly fastened by an alternate method;

Fig. 10 is a bottom view of the fixture base;

Fig. 11 is a detail elevation partly in section of the work table locking clamps employed on the fixture;

Fig. 12 is a section taken on the line 12—12 of Fig. 11;

Fig. 13 is a detail elevation of the seconds adjustment head of the ratchet model of the fixture;

Fig. 14 is a vertical section through the center line of Fig. 13;

Fig. 15 is a section taken on the line 15—15 of Fig. 14;

Fig. 16 is a section taken on the line 16—16 of Fig. 14; and

Fig. 17 is an enlarged view of the ratchet, pawl and lug elements illustrated in Figs. 14-16.

Figure 1:
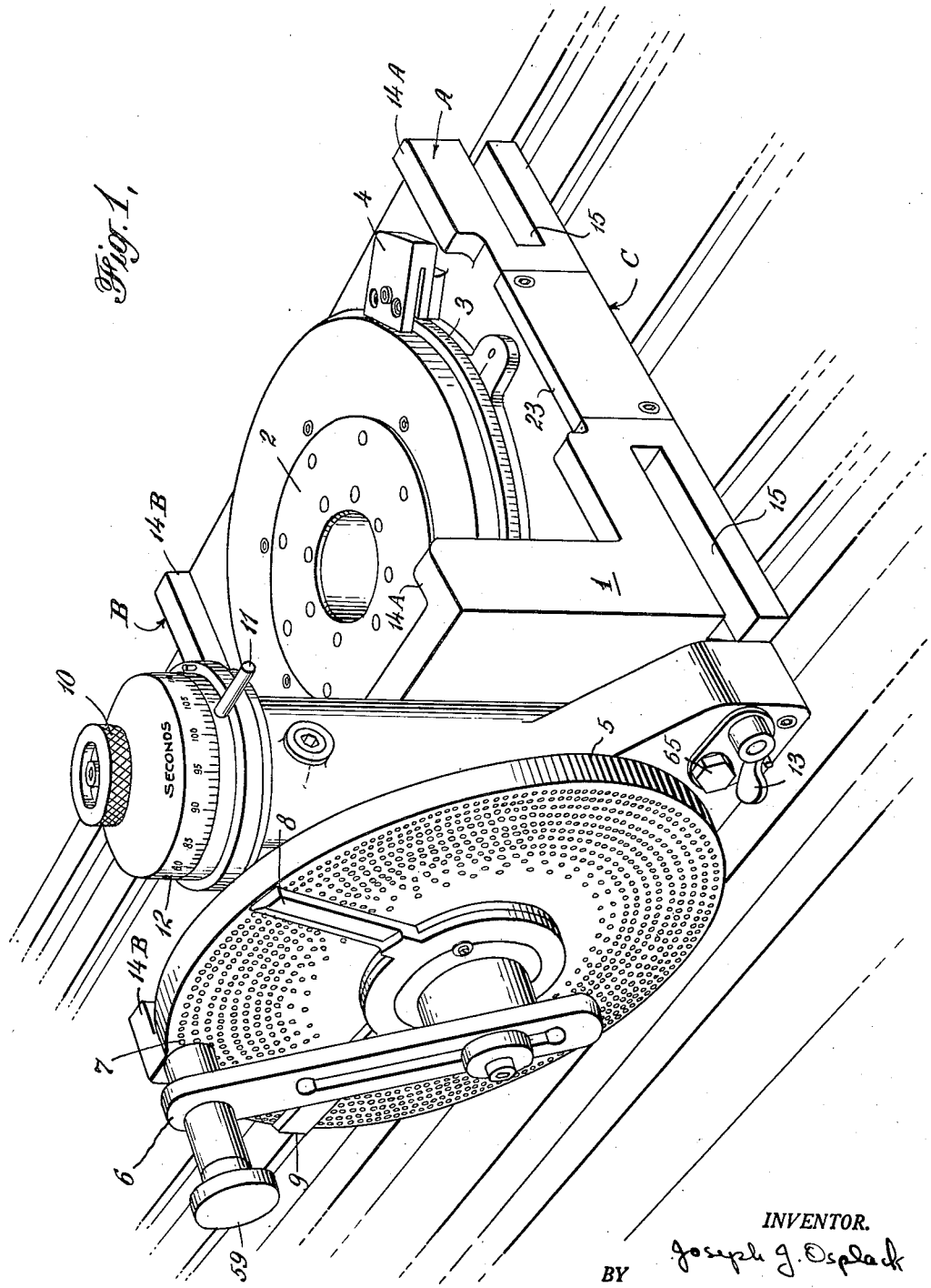
Fig. 1 is a perspective view of a fixture according to the invention.

*General description of the construction, use and operation of the fixture*

Referring to Fig. 1, we see in perspective a complete fixture according to the invention. This fixture is intended primarily to be used for light manufacturing operations on work calling for close tolerances or for precision inspection on parts requiring angular checking. The fixture in Fig. 1 is shown with the face C of its base 1 resting in a position in which its work table 2 is horizontal, or, expressed in a different frame of reference, is parallel to the surface to which it is attached.

The general assembly of the fixture comprises a cast base 1 having three flat-ground surfaces A, B and C. Surface C is parallel to a rotatable circular work table 2, while surfaces A and B are parallel to each other, but perpendicular to C.

Work table 2 is journalled in a precision type anti-friction bearing on the base 1 in a manner which will be more fully described hereafter. Associated with the work table 2, in which may be seen a plurality of tapped holes for holding the work in place, is a graduated cover 3 (Fig. 4). For locking the work table 2 against rotation after a precision adjustment of it has been made, a pair of clamps 4, 180° apart, are provided, only one of which is visible in Fig. 1.

There is journalled on base 1, in a plane at right angles to the work table 2, a conventional index plate 5 having a number of concentric rows of holes drilled in it. There are a different number of holes in each row, but all the holes in any one row are equally spaced apart. An index arm 6, of adjustable length, is rotatably fitted in front of index plate 5. An index pin 7 is arranged retractably on the end of arm 6 to engage any of the holes in plate 5. Top and bottom sector arms 8 and 9, respectively, are used as stop guides to aid in proper movement of pin 7 from one hole to another in the operation of the machine.

The shaft to which index arm 6 is fastened, which is concentric with the rows of holes in plate 5, is connected by a train of gearing, the details of which will be explained later, to work table 2 in such a way that one complete turn of index arm 6 will move work table 2 exactly through two degrees. A further refinement of the control over the angular movement of work table 2 upon that provided by the index plate 5 is afforded by means of a gearing arrangement to be explained later, activated by rotation of a seconds adjustment knob 10. This knob carries with it a seconds dial 12 from which the amount of movement imparted to table 2 by rotation of knob 10 can be measured.

Within the seconds dial 12 in one embodiment of my invention, there may be provided a quick setting ratchet arrangement activated by movement of a seconds handle 11.

A release handle 13 operates, in a manner to be explained later, to release work table 2 at will from connection with the gear trains leading to arm 6 and knob 10.

The seconds dial 12 should be graduated to read directly in seconds of angular motion imparted to work table 2. Thus, for instance, it may be convenient that one revolution of seconds adjustment knob 10 should produce two minutes of angular movement of work table 2, in which case seconds dial 12 will have 120 equal graduations.

In operation the fixture functions are very much like the conventional dividing head from which, indeed, index plate 5, index arm 6, index pin 7, and sectors 8 and 9 have been adopted without change. For using the fixture as a dividing head, the following table, the mathematics of which is derived from a combination of the fact that one turn of the index arm rotates the work table two degrees and the general procedure with index plates, sets forth all necessary information succinctly:

| | | | |
|---|---|---|---|
| (1) Number of division of complete circle to be indexed. | 20 | 21 | 61. |
| (2) Angle indexed | 18° | 17°8′34.286″ | 5°54′5.902″. |
| (3) Turns of index arm per division. | 9 | 8 | 2. |
| (4) Number of holes in index plate circle to be used. | Any | 42 | 59. |
| (5) Number of holes to advance index arm beyond complete turns listed. | None | 24 | 56. |
| (6) Number of seconds to advance by seconds adjustment after advancing index arm. | do | None | 12. |
| (7) Number of indexings to complete before setting off 1 additional second as compensation for error. | Unlimited | Unlimited | 150.[1] |

[1] Error of .0033 ... second in one indexing may be disregarded since cumulative error in 360° is only .2033 ... second. Until cumulative error exceeds .5 second no added accuracy is achieved by a compensatory shift of 1 second.

The simple formula from which the foregoing table is derived is:

$\frac{180}{N}$ = number turns of index arm for $N$ divisions

If the answer comes out a whole number, no more calculations need be made. Example:

$N = 20$ [line (1)].

$\frac{180}{20} = 9$ turns  [line (3)].

If 180 divided by N comes out a whole number plus a fraction whose denominator is evenly divisible into the number of holes in an available circle on the index plate, then only a sector setting is required and no seconds adjustment need be made. Example:

$N = 21$ [line (1)].

$\frac{180}{21} = 8\frac{12}{21}$ [8 whole turns, line (3)].

There is a 42 hole circle available. [Line 4.]

$\frac{12}{21} = \frac{24}{42}$

Therefore, the sector setting is made to facilitate an advance of 24 holes on the 42 circle at each indexing. ([Line 5.]

If 180 divided by N comes out a whole number plus a fraction whose denominator is not evenly divisible into the number of holes in an available circle on the index plate, then both a sector setting and an appropriate seconds adjustment must be determined. Example:

$N = 61$ [line (1)].

$\frac{180}{61} = 2\frac{58}{61}$ [2 whole turns, line (3)].

Since there is no circle on the index plate that is a multiple of 61, a selection must be made and fraction having an "available" denominator selected which fraction will be less than, but as close as possible to the one wanted. In this the fraction wanted is $\frac{58}{61}$ or .950819672

The selection made is $\frac{56}{59}$ or .949152542

The difference is .001667130. There is, of course, a circle having 59 holes. [Line (4).] A sector setting of 56 holes is made. [Line (5).] The difference must be made up by the seconds adjustment. To get this, the difference (.001667130), a fraction of a complete turn of the index arm, is multiplied by 7200, the number of seconds which equal the angular movement in degrees of the work table for one turn of the index arm [2°]. The product of .001667130 multiplied by 7200 is 12.00333. The seconds setting is therefore 12 [line (6)] and the necessary compensatory correction to correct for the omitted .00333 is negligible. [Line (7) and footnote.]

In using the fixture not as a dividing head, but in setting off or checking specified angles, it will be convenient to use an index plate circle of 120 holes. Suppose then that an angle of 9°56′27″ is to be set off from a given point on the work.

9°=4 turns of the index arm.
56′=116 holes on the 120 hole circle.
27″=27″ read directly on the seconds dial.

The arrangement of the release handle is such that rapid positioning in minimum increments of 2 degrees can be made by independent movement of the work table.

Construction details—the base

The base casting of the fixture is designated generally by the reference numeral 1. A complete and detailed understanding of its novel form and the advantages provided thereby can be had by reference to Figs. 1, 2, 3, 4, 6 and 10, especially. The base 1 is, on a section taken parallel to faces A and B, generally L-shaped. The face C lies along the long part of the L. The short part of the L lying perpendicular to face C has bolted to it a gear housing casting 66, the removal of which permits the disassembly of the gear trains connecting work table 2 with the indexing mechanism.

Faces A and B are flat-ground parallel to each other and perpendicular to face C. Face C is also flat-ground. All three faces, A, B and C, are so finished in order to permit the use of the fixture on a machine with a magnetic chuck. That is to say, these faces are precision finished in planes of accurate orientation with respect to the face and bore of work table 2 so that the fixture may be held in practically any position and, at the same time, the general angular shape and contact area of all these faces is such that a magnetic chuck will have ample holding power. The shape of face A is plainly shown in Fig. 1. Face B is of like shape. It will be observed that a spacer plate 23, which is specially ground, forms a part of face A in order to give access to a portion of the gear release mechanism to be described later. The shape of face C can be seen in Fig. 10 in which the flat-ground areas are shaded.

To provide equally for the attachment of this fixture to machine tools by the customary toe clamps, two provisions are made. First, for attaching the fixture with face C in contact with a supporting machine tool bed, for example, the toe clamp slots 15 around the perimeter of the base, are provided. Second, for attaching the fixture on faces A and B, respectively, toe clamp ribs 14A and 14B, as shown in Figs. 1 and 10 are provided. These attachment points are so located that the pressure of the clamps is directed perpendicular to a flat-ground portion of the attaching face and no distortion of base 1 is caused by clamp pressure.

Construction details—the work table

The work table of the fixture is generally designated by the reference numeral 2. A complete and detailed understanding of its novel form and the advantages provided thereby can be had by reference to Figs. 1, 2, 6, 7, 8, 9, 11 and 12, especially. The work table 2 is a casting in the general shape of a rather thick disc. It is journalled in a special anti-friction bearing structure in a bore precisely machined perpendicular to face C in base 1. On the upper surface of the work table 2 are a number of tapped holes 67 for the attachment of the work thereof. Bolted to the work table 2 is a concentric graduated cover ring 3 which essentially forms an extension of the work table. The graduated ring 3, as clearly illustrated in Fig. 6, is so machined that its lower face surface is separated, for example at the point designated by the arrow X, from the upper face surface of the base 1 normally by less than .001″. The cover ring 3 is thus especially arranged to cooperate with the work table locking clamps 4 (Figs. 1, 2, 11 and 12) so that the work table 2 can be locked in any desired position simply and without distortion.

The clamps 4 are made of deeply slotted blocks of metal, each having an upper lip 70 which overhangs a lower lip 71. Two side retaining bolts 37 lock clamps 4 to base 1, but these bolts engage only lower lip 71, being inserted through and clear of upper lip 70 in holes drilled therein. A center bolt 38, on the other hand, is threaded into base 1, but its head engages upper lip 70 while its shank passes through lower lip 71 without engaging it. It follows that tightening center bolt 38 will tend to depress upper lip 70 toward lower lip 71. Both clamps 4 are arranged with respect to the cover ring 3 so that their upper lips 70 extend over the perimeter of that ring. Accordingly, very slight pressure on bolt 38, depressing upper lip 70, is sufficient to force the abutting face surfaces of cover ring 3 and base 1 into clamped engagement without distorting work table 2.

Work table 2 is journalled in the bore of base 1 in a bearing structure which represents a novel adaptation of the bearing structure of Patent No. 2,352,911. That is to say, work table 2 is journalled in base 1 in a ball bearing which has, in addition to the normal balls 57 and races 39, 40, a plurality of plain bearings Y and Z, each comprising opposed bearing surfaces of the relatively moving parts with the clearance between the bearing faces less than the compression which the balls will withstand without exceeding their elastic limit, the plain bearings referred to having their bearing faces at different angles. Nearly equal results can be obtained, and great manufacturing savings effected if only the surfaces at Y are machined as plain bearings, the surfaces at Z being given sufficient clearance to be out of contact at all loadings.

This construction is illustrated especially in Fig. 6 from which it may be seen that a special outer race ring 39 is fitted in the bore of the base 1 arranged to engage a plurality of balls 57 between it and an inner race groove 40 cut on a concentric cylindrical surface of work table 2. In addition, the outer race ring 39 and the surface of work table 2 are so machined as to provide plain bearing surfaces at Y and Z, respectively. As explained in the patent referred to, when the load imposed on work table 2 exceeds the design load at which the fixture is precise and which is capable of being carried by balls 57, but, before the overload reaches a point in excess of the elastic limit of those balls, the plain bearing surfaces Y and Z, either singly or in combination, will come into engagement as the direction of the overload dictates. The vast majority of overloads encountered in use will engage Y alone adequately to protect the balls.

What is novel about the arrangement of the bearing structure of the present invention is that both the outer and inner ball races are solid rings. In order to make possible the insertion of the plurality of balls 57 required for the antifriction bearing just described, a plug 41 is provided reaching into the ball race channel radially at one point in the circumference of outer race ring 39. This plug is slightly larger in diameter than the balls 57 and is held in place by means of a set screw 42. An important feature of this plug assembly, in connection with set screw 42, is a notch 43 on the plug in which the screw engages. The angle at which notch 43 is cut is such that there is a wedge action tending to force plug 41 slightly outward from outer ball race ring 39, thus removing the possibility of the inner end of plug 41 crowding in and hindering balls 57 in the bearing.

In order to explain the construction of the outer ball race 39 and ball race plug 41 more fully, Figs. 7 and 8 are provided. The solid lines in Fig. 7 show an outer ball race ring blank before machining; the dotted lines show the shape it assumes after machining. In Fig. 8, we see the appearance of the assembled ball race ring and plug removed from base 1. The essential steps in the manufacture of this assembly are as follows:

On an unhardened ball race ring blank, the hole for plug 41 is drilled, the hole for set screw 42 is drilled and tapped and an unhardened plug 41 is inserted and locked in place by a set screw 42, as shown in Fig. 8. The machining, as outlined by the dotted lines, is carried out on the assembled ring and plug. The plug is then removed and the ring is hardened. The plug is not hardened, but is reinserted and relocked in place. The ring and plug are then finish ground together.

Thereafter, when a complete fixture is to be assembled, a work table casting 2 and an outer race ring 39 are assembled in proper alignment, the necessary number of balls 57 are passed into the ball race through the plug hole, and, before plug 41 is inserted, the notch 43 is cut on its upper surface. After the assembled ring and work table have been bolted into a base 1, the plug set screw 42 is tightened. As already explained, the shape of notch 43 forces plug 41, if it moves axially at all, to move to the rear. If the innerface of the plug is slightly back from the rest of the outer ball race surface, at most one ball will be relieved from load. The particular fixture illustrated has 40 balls in the bearing, of which 39 loaded balls are more than adequate to meet load requirements. In order to facilitate the removal of plug 41, it has been found advantageous to have a tapped hole 44 in its outer end.

An alternative structure, illustrated in Fig. 9, employs a taper pin 58 to hold plug 41 in the upper ball race ring 39, the angles of which pin are selected to make it the full equivalent of set screw 42 and notch 43.

There is bolted to the undersurface of work table 2, a ring gear 16 having 180 teeth adapted to engage a worm.

*Construction details—work table drive gearing*

The drive of the work table from the angle measuring mechanism of the indexing head is accomplished by a gear train activating a worm shaft 18 on whose inner end a worm 17 is carried in close engagement with the work table gear 16. A complete and detailed understanding of the novel arrangement of this gear train can be had by reference especially to Figs. 2, 3, and 5.

A spur gear 26 on the outer end of worm shaft 18 is geared to a spur gear 29 carried on the inner end of index arm shaft 54 through two intermediate spur gears 27, 28. Shaft 54 as well as the intermediate gears 27, 28 and the outer end support ball 20 of worm shaft 18 are carried by a gear housing casting 66 bolted to the base 1, as appears especially in Fig. 5. It will be observed that index arm shaft 54 is actually journalled inside a mounting sleeve 63 which is fitted in housing 66 and that another and rather massive helical gear 30, to which index plate 5 is fastened by bolts 64, is concentrically journalled about the outside of sleeve 63.

To the outer end of index arm shaft 54, index arm 6 is fastened by index arm retaining bolt 55 and washer 56 in such a manner that the radial extension of index arm 6 from the center of shaft 54 is adjustable. On the outer end of index arm 6, index pin 7 is retractably mounted inside housing 72. The index pin 7 is formed as an integral part of a rod 60 having a shoulder 61. A spring 62 is arranged inside housing 72 engaging shoulder 61 to urge index pin 7 extensibly into engagement with the holes of index plate 5. Index pin retracting handle 59 is carried on the outer end of rod 60 for withdrawing index pin 7 against the resistance of spring 62.

It will be observed that any rotation of index arm 6 about the center of shaft 54 will impart a like rotation to worm shaft 18, the ratio of gear elements 26, 27, 28 and 29 being chosen to this end. The ratio of worm 17 is so selected that one revolution of it will advance work table gear 16 one tooth, i. e. through two degrees of arc.

The fine adjustment of the fixture of this invention is provided by a seconds worm 31 engaging spur gear 30. Movement of spur gear 30 is effective to drive the work table 2 through the gearing 26, 27, 28, 29 whenever index arm 6 is pinned to index plate 5. Seconds worm 31 is carried on the lower end of seconds worm shaft 32, the upper end of which is keyed to seconds adjustment knob 10 and seconds dial 12. The pitch of seconds worm 31 is so selected that one revolution of seconds worm shaft 32 will turn spur gear 30 through one tooth. Since spur gear 30 is selected to have 60 teeth, it follows that a complete revolution of seconds worm shaft 32 will turn work table 2 through two minutes of arc and seconds dial 12 is accordingly calibrated into 120 equal divisions.

In order to eliminate any backlash in the engagement between seconds worm 31 and spur gear 30, a friction device is provided which requires the bearing bore 33 for seconds worm shaft 32 in gear housing casting 66 to be slightly oversized. An auxiliary bore communicating at right angles with bore 33 is drilled in the housing 66 and a ball 34 is inserted therein, arranged to be urged by a spring 35 against shaft 32. Ball 34 and spring 35 are held in place by a set screw 36. This has the double effect of maintaining worm 31 in tight mesh with gear 30, thus eliminating any backlash and, at the same time, of introducing a friction drag effect, stabilizing shaft 32 against unintentional rotation.

Construction details—work table release

A work table release mechanism is provided for withdrawing worm 17 from engagement with the work table gear 16. A complete and detailed understanding of its novel arrangement and the advantages provided thereby can be had by reference especially to Figs. 2, 4, 5 and 6.

The work table worm shaft 18, which has at its inner end worm 17 normally engaging work table ring gear 16 and at its outer end spur gear 26 in engagement with idle spur gear 27, is carried by a ball at each end. The ball 20 at the outer end is carried in gearing housing casting 66 by worm shaft retainer plug 65. The ball 19, at its inner end, is carried by a throw-out bar 21 at right angles to shaft 18 which, in operation, is free to slide axially back and forth. A throw-out compression spring 22 operating against spacer plate 23 urges throw-out bar 21 inward thus tending to carry worm 17 on the inner end of shaft 18 into firm engagement with work table ring gear 16 insuring drive without backlash. Work table release handle 13 is mounted on the outer end of a release shaft 24, the inner end of which carries an eccentric 25 engaging a slot in the throw-out bar 21. The effect of rotation of release shaft 24 is to cause eccentric 25 to withdraw throw-out bar 21 against the compression of spring 22, thus releasing work table ring gear 16 from worm 17.

It will be observed that the center line of ball 19 carried by throw-out bar 21 is located on the center line of that bar. It thus follows that any slight rotation of throw-out bar 21 in its bearing in base 1 will have no effect on the location of the ball surface positioning the inner end of worm shaft 18. Although this release arrangement permits free rotation of work table 2, it will be observed that the minimum increment which can be adjusted in this way is two degrees since the release provides for an in-and-out-of mesh clutching and declutching rather than an infinitely variable arrangement.

Construction details—the seconds adjustment ratchet drive

In a further refinement of a fixture according to my invention, a ratchet arrangement may be provided in connection with the drive of seconds worm 32 whereby seconds handle 11 cooperating with seconds handle stop 53 may be used quickly to set off a predetermined seconds adjustment without the necessity of direct reading of seconds dial 12. A complete and detailed understanding of this novel construction and the advantages provided thereby can be had by reference to Figs. 13–17, inclusive, and by comparison with the simpler arrangement illustrated in Fig. 3.

On the ratchet arrangement of the seconds adjustment according to my invention, the seconds worm shaft 32 passing through its bearing 33 in housing casting 66 is surrounded by a stop block ring 50 which is bolted to housing 66 by bolts 73. Surrounding stop block ring 50 is an index cam ring 69, which may be rotated about stop block ring 50 and locked in any position in relation thereto by means of a lock screw 52 engaging in lock screw groove 74. Index cam ring 69 has an upwardly extending collar portion 75 in contact with stop block ring 50. A segment of the collar 75 further extends axially away from ring 69 to form a pawl lifter 51 for a purpose to be explained later.

Lying on index cam ring 69 and surrounding the upwardly extending collar portion 75 thereof, but not extending so high as pawl lifting section 51, is a pawl ring 45. Pawl ring 45 is rotatable in relation to index cam ring 69 and, for the purpose of rotating it, seconds handle 11 is attached to it protruding outward. On the upper surface of pawl ring 45, pawl 47 is mounted on pawl pin 46.

As in the ratchetless version of this fixture (Fig. 3), seconds knob 10 and seconds disc 12 are keyed to the upper end of seconds worm shaft 32. In the ratchet version, however, a ratchet disc 48 is also keyed to shaft 32 inside seconds dial 12. Ratchet disc 48 is made thinner than pawl 47 and arranged to engage the upper portion thereof only (Fig. 14). As shown in Fig. 15, unless forced out of engagement by the pawl lifting section 51 of index cam ring 69, pawl 47 is forced into engagement with the teeth of ratchet disc 48 by the action of a spring 68. It will be observed, especially in the enlarged view (Fig. 17), that the teeth on ratchet disc 48 are so arranged that a clockwise motion of pawl ring 45 will, through the engagement of pawl 47 in ratchet disc 48, carry shaft 32 with it. It is likewise apparent that an anti-clockwise movement of pawl ring 45 will merely cause pawl 47 to click over the teeth of ratchet disc 48.

A stop block 49 is carried on the upper surface of stop block ring 50 beneath the teeth of ratchet disc 48 and capable of engaging the lower portion of pawl 47, as shown especially in the enlarged view (Fig. 17). The tooth angles of the teeth on ratchet disc 48, the face angle of pawl 47 and the face angle of stop block 49 are so selected that, when the lower portion of pawl 47 comes into engagement with stop block 49, the upper portion of pawl 47 is pressed into closer engagement with ratchet disc 48, thus providing a positive and precise stop for movement of shaft 32 under the influence of seconds handle 11.

It will be observed that the location of handle stop 53 on index cam 69 is such that whenever handle 11 is turned to reach handle stop 53 in an anti-clockwise direction, the pawl lifting section 51 of the index cam will disengage the pawl from ratchet disc 48. In this manner, the stop block 49 and the handle stop 53 serve as seconds adjustment stops, the distance between which can be adjusted to provide any desired number of seconds of motion to be imparted to work table 2. The adjustment of the angular extent of this motion is made by loosening and tightening lock screw 52, by means of which the relative positions of index cam ring 69 carrying handle stop 53 and stop block ring 50 carrying stop block 49 can be adjusted. It will be noted that the ratchet model can be employed exactly as the plain model merely by turning the seconds handle 11 back against the handle stop 53 by which the pawl 47 is disengaged from ratchet disc 48 and the seconds knob 10 may be manually operated in either direction.

I claim:

1. An indexing fixture comprising a base constructed to be removably attached to a machine tool or like support, a rotatable work table journalled in said base, an index plate journalled in said base, an index arm journalled in said base concentric with the bearing supporting said plate, means carried by said arm for detachably locking it against rotation relative to said plate, a train of reduction gearing connecting said arm to said table including a shaft, a ball supporting and affording a pivot for said shaft at each end thereof, a worm carried by said shaft near one end thereof, a worm wheel affixed to and concentric with said table, said wheel being driven by said worm, and an element movably mounted in said base for carrying the ball which supports the end of said shaft which is adjacent said worm, said element being movable perpendicularly to the axis of said shaft whereby to disengage said worm from said wheel.

2. An indexing fixture comprising a base constructed to be removably attached to a machine tool or like support, a rotatable work table journalled in said base, an index plate journalled in said base, an index arm journalled in said base concentric with the bearing supporting said plate, means carried by said arm for detachably locking it against rotation relative to said plate, a train of reduction gearing connecting said arm to said table including a shaft, a ball supporting and affording a pivot for said shaft at each end thereof, a worm carried by said shaft near one end thereof, a worm wheel affixed to and concentric with said table, said wheel being driven by said worm, and a throw-out bar mounted in said base for slidable movement perpendicular to the axis of said shaft, said bar being cut away at its inner end adjacent said shaft to provide a recess in which the ball which supports the adjacent end of said shaft is seated, said recess being so proportioned that the center point of the seated ball lies on the center line of said bar, spring means for urging said bar in a direction to press the worm into engagement with the worm wheel, and manually operable means for sliding said bar against the action of said spring to disengage said worm from the worm wheel.

3. An indexing fixture comprising a base constructed to be removably attached to a machine tool or like support, a rotatable work table journalled in said base, an index plate journalled in said base, an index arm journalled in said base concentric with the bearing supporting said plate, means carried by said arm for detachably locking it against rotation relative to said plate, a fine adjustment knob journalled in said base, a train of reduction gearing connecting said knob to said plate, a train of reduction gearing connecting said arm to said table including a shaft, pivot means for said shaft, a worm carried by said shaft near one end thereof, a worm wheel, affixed to and concentric with said table driven by said worm, a ratchet disc affixed to the shaft of said fine adjustment knob, a rotatable ring journalled on said base concentric with but spaced from said shaft, a pawl mounted on said ring resiliently engaging the teeth of said disc, and separate stop means for limiting the clockwise and anticlockwise rotation of said ring, the angular spacing between said separate stop means being adjustable.

4. An indexing fixture comprising a base constructed to be removably attached to a machine tool or like support, a rotatable work table journalled in said base, an index plate journalled in said base, an index arm journalled in said base concentric with the bearing supporting said plate, means carried by said arm for detachably locking it against rotation relative to said plate, a fine adjustment knob journalled in said base, a train of reduction gearing connecting said knob to said plate, a train of reduction gearing connecting said arm to said table including a shaft, pivot means for said shaft, a worm carried by said shaft near one end thereof, a worm wheel affixed to and concentric with said table driven by said worm, a ratchet disc affixed to the shaft of said fine adjustment knob, a rotatable ring journalled on said base concentric with but spaced from said shaft, a pawl mounted on said ring resiliently engaging the teeth of said disc, the thickness of the pawl being greater than the thickness of said disc, a stop block affixed to the base in a position to engage the lower portion of said pawl to limit rotation in one direction, and, as the stop means limiting rotation in the opposite direction, a second rotatable ring journalled on said base concentric with but spaced from the fine adjustment knob shaft, said second ring being arranged on the side of said first ring away from the ratchet disc and having a concentric collar portion extending between said first ring and said base toward said ratchet disc, said collar portion extending toward said ratchet disc a distance not exceeding the depth of said first ring for a major part of its circumference and a distance exceeding the combined depth of said first ring and the lower portion of said pawl for a minor portion of its circumference, and lock means for fastening said second ring to the base in any position about the axis of said shaft.

5. As a sub-combination, a ratchet disc affixed to a shaft, a rotatable ring concentric with but spaced from said shaft, a pawl mounted on said ring resiliently engaging the teeth of said disc, the thickness of said pawl being greater than the thickness of said disc, and separate stop means for limiting the clockwise and anticlockwise rotation of said ring including a stationary stop block positioned to engage the lower portion of said pawl for limiting rotation in one direction, and, as the stop means limiting rotation in the opposite direction, a second rotatable ring concentric with but spaced from said shaft, said second ring being arranged on the side of said first ring away from the ratchet disc and having a concentric collar portion extending inside said first ring toward said ratchet disc, said collar portion extending toward said ratchet disc a distance not exceeding the depth of said first ring for a major part of its circumference and a distance exceeding the combined depth of said first ring and the lower portion of said pawl for a minor portion of its circumference, and lock means for fastening said second ring in any position about the axis of said shaft.

References Cited in the file of this patent

UNITED STATES PATENTS

| Number | Name | Date |
|---|---|---|
| 798,970 | McGregor | Sept. 5, 1905 |
| 1,075,829 | Knipe | Oct. 14, 1913 |
| 1,146,995 | Bossert | July 20, 1915 |
| 1,174,541 | Bernheim | Mar. 7, 1916 |
| 1,295,363 | Parker | Feb. 25, 1919 |
| 1,309,902 | Martyn | July 15, 1919 |
| 1,442,003 | Rohrer | Jan. 9, 1923 |
| 1,446,271 | Pollock | Feb. 20, 1923 |
| 1,638,396 | Hall et al. | Aug. 9, 1927 |
| 1,786,344 | Harter | Dec. 23, 1930 |
| 2,046,462 | Jorgensen | July 7, 1936 |
| 2,228,583 | Parsons | Jan. 14, 1941 |
| 2,369,425 | Becker | Feb. 13, 1945 |
| 2,570,444 | Henkel | Oct. 9, 1951 |

FOREIGN PATENTS

| Number | Country | Date |
|---|---|---|
| 408,394 | Great Britain | Apr. 12, 1934 |
| 561,958 | France | Oct. 22, 1923 |
| 572,529 | Great Britain | Oct. 11, 1945 |